June 20, 1961 H. L. LANSING 2,989,240
INTEGRATED INSULATED RAIL JOINT BAR
Filed May 19, 1959
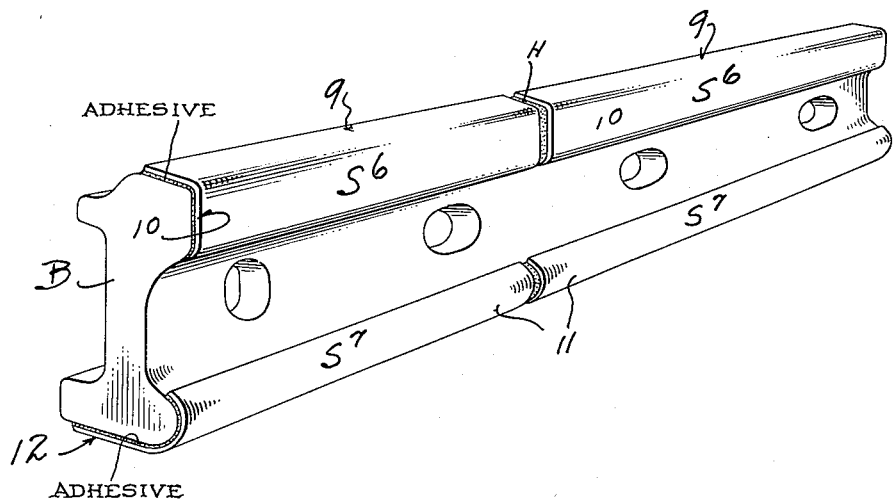
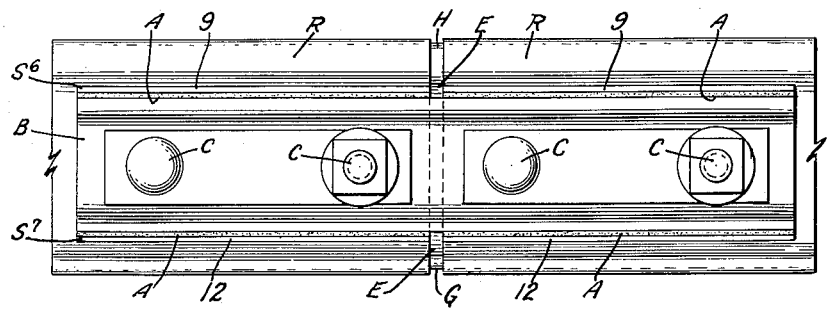
INVENTOR
HORACE L. LANSING
ATTORNEY

United States Patent Office 2,989,240
Patented June 20, 1961

2,989,240
INTEGRATED INSULATED RAIL JOINT BAR
Horace L. Lansing, Rutherford, N.J., assignor to Poor & Company, Chicago, Ill., a corporation of Delaware
Filed May 19, 1959, Ser. No. 814,182
2 Claims. (Cl. 238—244)

This application is a continuation-in-part of my prior application Serial No. 454,099, filed November 12, 1954, which is a division of my co-pending original application Serial No. 120,144, filed October 7, 1949, now Patent No. 2,702,161 dated Feb. 15, 1955.

The invention relates to rail joint bars, sometimes referred to as splice bars used to provide an insulated rail joint as shown, for example, in Patent No. 1,133,921, Braine et al., March 30, 1915 and more particularly to a joint bar and shim or sheath construction wherein the shim or sheath and the bar are held together by an adhesive which also serves to insulate the shim from the bar thus providing an integrated insulated rail joint bar unit.

One of the problems arising in connection with insulated joints is that the so-called hard fiber insulation is unstable, as compared with the metal of the bars and/or a protective shim, said instability resulting from swelling, cracking or shearing.

Where vulcanized fiber insulation has been used in insulated joints in the past, moisture tends to swell and soften it, pressure compresses it, and temperature changes compound these conditions thereby contributing, more or less, rapidly to break down the insulating qualities of the joint. For example, insulated joints of the type shown in the Payne patents, Nos. 2,441,329 and 2,628,784, gave the fiber insulation the protection of metal shims to produce a joint known to the industry as an armored insulated joint. In joints of this type continual pounding on the receiving rail, due to passing wheel loads, or, as it is sometimes known, rail batter on the armor of the receiving end of the joint produces fissures or cracks in the armor or metal shim and consequently such cracks permitted moisture to make its way into the relatively soft insulating fiber. Moreover, since the fiber was shielded by the substantially U-shaped armor or shim, moisture was trapped or retained and joint deterioration became accelerated.

While the Payne type of joint including the shim and the fiber insulation fitting over the head of the bar illustrates one way of solving the problem of assembling a shim to the bar to obviate the conditions recited in the original application, nevertheless, it has been established that loosely assembling or merely mechanically interlocking a metal shim over the fiber insulation does not provide a dimensionally stable type of insulation which is essential to the long sought for longevity for an insulated joint.

On the other hand, the inherent insulating properties of the adhesive used to connect the shims to the bars as set forth in my original application provided the dual function of fixing or securing the shims to the bar by an adhesive to make a unitary assembly, and, also, to provide the necessary dimensionally stable insulation, thereby effectively forming a plant insulated joint which may be fabricated at the plant and wherein all parts are assured of being held in fixed relation in an integrated unit while the dimensions of the insulation never change as they do in fiber.

Accordingly, the object of this invention is to provide an integrated pre-assembled insulated joint bar unit comprising combined units of rail joint bars and shims which act as abrasion sheaths which are insulated from the bars by the attaching adhesive, and, which as a unit, may be expeditiously handled without the difficulties attendant to many decades of shim protected insulated fiber.

The above object and advantages of the invention will appear more fully from the following description considered together with the accompanying drawing, in which:

FIGURE 1 is a side elevation of an insulated rail joint embodying the present invention and illustrating the location of the end post and the insulation gap at the location of the end post and the rail ends.

FIGURE 2 is a perspective view of a unit illustrating head and base shims secured to the head and base of the bar by an adhesive.

FIGURE 1 illustrates an insulated rail joint embodying the present invention. That is to say, the insulated joint bar B set forth herein is applied across the ends of the rail ends R—R by suitable fastenings C, the adjacent vertical faces of the rail ends being separated by an end post E.

It will, therefore, be seen that the rail ends R—R are spaced apart to provide a gap G between them which is filled by an insulating end post and, to preserve this gap between the rail ends and prevent conduction of electrical current through the joint bars B and their fastenings, the inner ends of shims $S^6$, $S^7$, are spaced apart to provide a corresponding gap H exposing the adhesive coating A which serves as an insulator at the gap. It will thus be seen that since the shims are bonded to the bars in spaced relation, the gap G will be preserved from the time of manufacture to the time of installation.

As will be observed from the drawings, the joint bar B which is shown by way of illustration and not by limitation as to type, is equipped with head shims $S^6$ and base shims $S^7$ which are bonded to the head and foot portions of the bar.

Each of the shims or sheaths is made of metal of the desired thickness and is rolled or shaped to fit the profile of the related parts of the bar B. In each instance the shims $S^6$ and $S^7$ are held to the related parts of the bar by any suitable type of mastic or adhesive, such as a sticky non-metallic glutinous substance, applied and set as instructed by the maker, for example, an epoxy resin, and which inherently has insulating properties. In practice, the adhesive may be applied to either the surface of the bar or the inner face of the shims, throughout the length of the latter so that in any event the shims are bonded to the related portions of joint bar surface.

Referring further to the head shims $S^6$, it will be observed that the same are spaced apart at their inner ends to provide a gap which will break the circuit to provide the desired insulated joint when the bars are installed in track and includes opposite wing portions 9 and 10, the former overlying the load bearing surface of the bar, and the latter shielding the inner face of the bar head.

The bottom shims $S^7$ are also provided with wing portions 11 and 12, the former engaging the bottom load bearing surfaces of the bar and the upper face of the base flange of the rail while the wings 12 shield the heel of the bottom chord of the bar.

It will, of course, be understood that the load bearing surfaces 9 and 11 of the shim may be of the intermittent bearing type in accordance with the prior art in the respect that they do not bridge the gap between the rail ends which is normally filled by an insulating end post. In other words, the sheaths $S^6$ which cover and protect the bonding adhesive from abrasion have their inner ends spaced apart as shown in the drawing, and the lower sheaths $S^7$ are similarly spaced at their inner ends.

From the foregoing, it will be understood that the invention of my original application provides a practical solution to a long standing problem in the field of insulating rail joint application and maintenance by making it possible to provide an armored insulated joint bar which is free of the hazards of multiple parts and compressible or distortable insulation heretofore encountered. In other words, the invention is primarily directed to a combined joint bar and shim unit wherein the shim and bar are integrated or connected by an adhesive for all normal handling, installation and maintenance purposes.

I claim:

1. A pre-assembled integrated insulated rail joint bar unit for simplifying the handling of such units prior to installation and also facilitating the safe positioning thereof into the related fishing spaces of spaced railway rail ends during movement of the unit to operative position relative to said ends, comprising, in combination, a joint bar having head and foot portions including upper and lower load bearing surfaces, a non-metallic settable adhesive providing dimensionally stable electrical insulation covering the load bearing and non-load bearing surfaces of the bar, and horizontally aligned metal sheaths of angular cross-section spaced apart at their inner ends to provide a gap at the location of the space between said rail ends, said angular cross-section providing wing portions respectively bonded to a related load bearing surface of the bar and to a related inner non-load bearing surface, the said gap between the inner ends of said sheaths exposing the bonding insulation to maintain an open circuit gap between said metal sheaths.

2. A packaged insulated joint bar for use in bridging and connecting the spaced ends of railway rails, comprising, a splice member having upper and lower load bearing surfaces, horizontally aligned metal abrasion sheaths overlying said upper and lower load bearing surfaces and having their inner ends spaced apart, and a bonding adhesive of insulating characteristics securing said sheaths on the load bearing surfaces to provide a gap at the location of the space between said rail ends and maintaining said sheaths spaced apart, said adhesive providing a dimensionally stable electrical insulation protected by said sheaths.

References Cited in the file of this patent

UNITED STATES PATENTS

| | | |
|---|---|---|
| 2,069,361 | Fifield | Feb. 2, 1937 |
| 2,083,316 | Condit | June 8, 1937 |
| 2,628,784 | Payne | Feb. 17, 1953 |

FOREIGN PATENTS

| | | |
|---|---|---|
| 698,665 | Great Britain | Oct. 21, 1953 |